(12) United States Patent
Edwards et al.

(10) Patent No.: US 7,979,655 B2
(45) Date of Patent: Jul. 12, 2011

(54) DYNAMIC OPTIMIZATION OF DEVICE LIMITS AND THRESHOLDS IN A WRITE CACHE

(75) Inventors: Joseph Roger Edwards, Rochester, MN (US); Robert Edward Galbraith, Rochester, MN (US); Adrian Cuenin Gerhard, Rochester, MN (US); Timothy James Larson, LaCrosse, WI (US); William Joseph Maitland, Jr., Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 12/041,800

(22) Filed: Mar. 4, 2008

(65) Prior Publication Data
US 2009/0228660 A1    Sep. 10, 2009

(51) Int. Cl.
*G06F 13/00* (2006.01)

(52) U.S. Cl. ......................................... 711/162

(58) Field of Classification Search .................. None
See application file for complete search history.

(56) References Cited

U.S. PATENT DOCUMENTS

| | | | |
|---|---|---|---|
| 6,775,738 B2* | 8/2004 | Ash et al. ...................... | 711/113 |
| 7,062,675 B1* | 6/2006 | Kemeny et al. ................. | 714/15 |
| 7,747,664 B2* | 6/2010 | Patel et al. .................... | 707/826 |
| 2005/0080994 A1* | 4/2005 | Cohen et al. .................. | 711/118 |
| 2007/0220201 A1* | 9/2007 | Gill et al. ..................... | 711/113 |

* cited by examiner

*Primary Examiner* — Duc T Doan
(74) *Attorney, Agent, or Firm* — Rabin & Berdo, PC

(57) ABSTRACT

A method, computer program product and system for dynamically optimizing the limit and the thresholds of a write cache for a storage adapter connected to storage devices, includes measuring continually an overall locality of data in the write cache for the storage devices, calculating the limit of the write cache dynamically for each storage device using the overall locality and a device-related information, and calculating the threshold of the write cache dynamically for each storage device by combining a fair amount and a device-related additional amount.

18 Claims, 4 Drawing Sheets

DYNAMIC OPTIMIZATION OF DEVICE LIMITS AND THRESHOLDS IN A WRITE CACHE

BACKGROUND

1. Technical Field

The present invention relates to a write cache for storage devices. More specifically, it relates to dynamic optimization of device limits and thresholds in a write cache.

2. Background Information

Storage adapters in a computer system often implement a write cache to enhance performance. The write cache is typically non-volatile (e.g. battery backed), and is used to mask the write penalty from storage devices such as those in a RAID (redundant array of independent disks) configuration. A write cache can also improve the performance of a storage adapter by coalescing multiple host operations placed in the write cache into a single destage operation which is then processed by the RAID layers or disk devices.

The size of write caches has grown dramatically over time due to both the size increase of memory chips and the utilization of compression techniques applied to compress the data in the caches. Although disk drive capacities have also greatly increased, the number of random operations per second that a disk drive can process has not increased as significantly. Therefore, a large amount of data may be placed into a write cache for a disk drive, which will take an excessive amount of time to flush when, for example, the storage subsystem needs to be shutdown. For example, in a storage adapter with a 1.5 GB write cache, if the entire write cache can be filled with data for a single disk drive, it can take tens of minutes to destage the write cache to the disk drive when the data are stored in randomly placed small blocks.

Usually write caches need to be flushed within a short amount of time. Hence, a limit is established to prevent the write cache from being populated with too much data for a single disk drive. Some storage adapters establish a "Per Device Limit" as the limit. For example, a storage adapter can set a 100 MB "Per Device Limit", thus limiting the time required to destage the write cache data. However, "Per Device Limit" is based on worst case destage operations when the data are stored in randomly placed small blocks, and this limit is fixed for all scenarios. Some storage adapters also use a "Per Device Threshold". When the "Per Device Threshold" is reached, the write cache is destaged to the device to attempt to avoid the "cache full" condition. The "Per Device Threshold", however, is not optimized for fair use of the write cache by all disk drives attached to the adapter, and this threshold is determined beforehand. Hence, these limits cannot be adjusted dynamically to achieve optimal performance.

SUMMARY

A method, computer program product and system for dynamically optimizing the limit and the thresholds of a write cache for a storage adapter connected to storage devices, includes measuring continually an overall locality of data in the write cache for the storage devices, calculating the limit of the write cache dynamically for each storage device using the overall locality and a device-related information, and calculating the threshold of the write cache dynamically for each storage device by combining a fair amount and a device-related additional amount.

DETAILED DESCRIPTION

Figure 1:
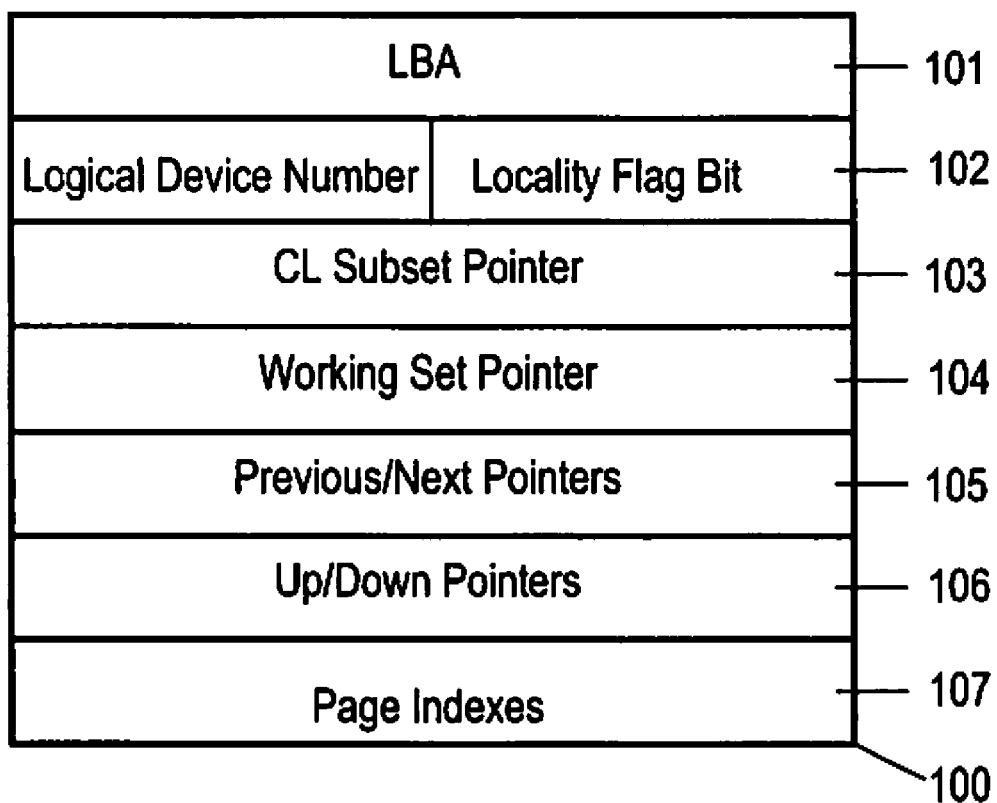
FIG. 1 is a block diagram of a cache line used for the calculating "Figure of Locality".

The invention will now be described in more detail by way of example with reference to the embodiments shown in the accompanying Figures. It should be kept in mind that the following described embodiments are only presented by way of example and should not be construed as limiting the inventive concept to any particular physical configuration. Further, if used and unless otherwise stated, the terms "upper," "lower," "front," "back," "over," "under," and similar such terms are not to be construed as limiting the invention to a particular orientation. Instead, these terms are used only on a relative basis.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention enables a method to continually calculate a "Figure of Locality" that indicates the overall locality of the write cache data for each device. The "Figure of Locality" determines how many destage operations are required to flush the write cache data to the device. The present invention also enables a method to calculate a dynamic "Per Device Limit" that takes into account the locality of write cache data per device and other factors, such as the RAID level of the associated storage device and whether the device is operating with a failed disk drive. The present invention also optimizes a dynamic "Per Device Threshold" to achieve a fair use of the write cache for all disk drives. The "Per Device Threshold" allows a subset of the attached disk drives to use more than their default fraction of the write cache space, if other attached disk drives are not utilizing their fraction of the write cache space.

Figure 2:
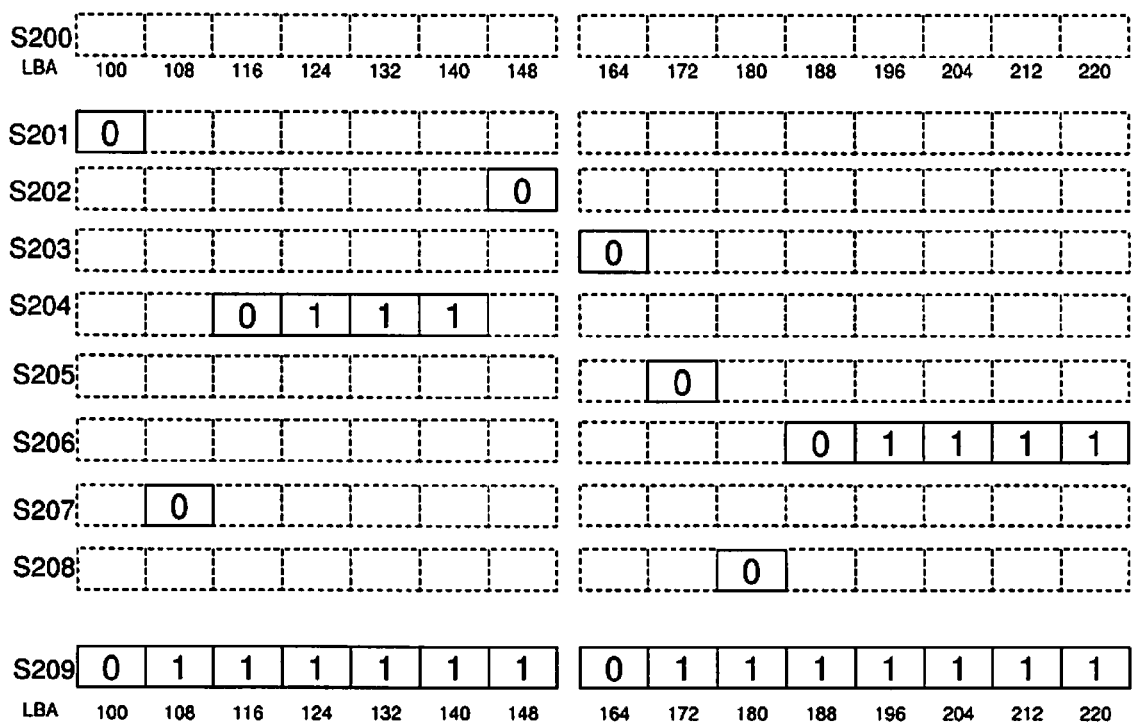
FIG. 2 is a diagram illustrating the updating of "Figure of Locality".

In one embodiment of the present invention, the "Figure of Locality" has a value defined in the range of 0 to 1, where 0 indicates that data in the write cache for the device has no locality (e.g. all data are stored in randomly placed small blocks), and 1 denotes that all data in the write cache for the device has high locality (e.g. the data are in sequential blocks). FIG. 1 illustrates a typical cache line (CL) 100, each with a logical block address (LBA) 101, a field 102 for identifying the storage device via a logical device number (LDN) and for the locality flag bit, a CL subset pointer 103, a working set pointer 104, previous/next pointers 105, a up/down pointer 106 and page indexes 107. The "Figure of Locality" is calculated using the locality flag bit of the CL and a locality counter (not shown in FIG. 1) that records the total number of locality flag bits set to 1 for each device. Each locality flag bit has a value 0 or 1 to describe the locality of the data in the corresponding LBA. FIG. 2 illustrates the "Figure of Locality", in which a CL represents eight consecutive LBAs. S200 shows the locality flag bits of CLs for a single disk in which their LBAs are 100-148 and 164-220. S201-S208 illustrate eight successive operations and how these operations change the locality flag bits of the data, where the value (0 or 1) shown for each LBA is the value of its locality flag bit. The locality flag bits and locality counters are updated as follows:

(1) When a host write operation is directed to write cache, the locality flag bit is set to 0 in the first CL and set to 1 in all subsequent CLs of the operation as the CLs are inserted into the cache directory. The locality flag bits of subsequent CLs are set to 1 to show that these CLs are sequential to (and thus have locality to) the prior CL. S204 and S206 in FIG. 2 illustrate this updating.

(2) If the write cache contains data for the LBA sequentially prior to the first CL, the locality flag bit is set to 1 in the first CL of the host write operation. This updating process is illustrated in S209 when the locality flag bits are changed to 1 for LBA 108, 116, 148, and LBA 172-188.

(3) Whenever a locality flag bit is set to 1, the corresponding locality counter is incremented by one.

(4) When a write cache destage occurs and CLs are removed from the cache directory, the corresponding locality counter is decremented by one for each CL that has the locality flag bit set to 1.

The final localities of the data after the eight operations are shown in S209. The ratio of the number of CLs with a locality value 1 to the total number of CLs for each device is defined as the value of the "Figure of Locality". In FIG. 2, the total number of CLs is 15, and 13 CLs have a locality value of 1, so the "Figure of Locality" is 13/15.

It is typically required that the write cache can be flushed within a few minutes (e.g. within less than 2 minutes). In one embodiment of the present invention, a "Per Device Limit" is calculated (and frequently recalculated) to ensure that the number of CLs in the write cache for a device is limited, so the write cache can always be flushed within the required time. Three factors are used to calculate the "Per Device Limit": the "Figure of Locality", the RAID level of the associated storage device and whether the device is exposed (i.e. operating with a failed disk drive). A device with a low "Figure of Locality" value, a higher overhead RAID level, and operating with a failed disk drive will have a lower "Per Device Limit" than a device with a high "Figure of Locality" value, a lower overhead RAID level, and no failed disk drives. The following is the pseudo-code for calculating the "Per Device Limit":

```
If #CLs > 256
    Approximate # Destages =   MAX(#CLs − #CLsWithLocality,
    #CLs / 64)
    Average #CLs Per Destage =   #CLs / Approximate # Destages
    "Per Device Limit" = Max#DestageOps * Average #CLs Per Destage
Else
    // Little to no data currently in write cache for device
    "Per Device Limit" = default value
```

Where the Max#DestageOps is the number of operations which can be destaged to the device within a required amount of time (e.g. 2 minutes) given the RAID level of the array of which the device is a member (e.g. RAID-1, 5, or 6) and whether the array is exposed or not.

Note that a large step function should be avoided that could cause the "Per Device Limit" to quickly change to a smaller value. For example, if a device has 5000 CLs worth of data in the write cache with a current limit of 6000 CLs, when the device suddenly goes exposed, it is possible for the desired limit to suddenly become 4000 CLs. The actual "Per Device Limit" for this particular device should be lowered quickly to 5000 CLs but then lowered slowly to 4000 CLs, and thus ensuring at least new host write operations are still allowed at a slow rate and no timeouts are encountered. The write cache can alternatively be bypassed for new host operations until the device is again under the required limit.

When the "Per Device Limit" is reached, the device cannot place consequent host write operations into the write cache, which hurts the performance. A threshold for each device, the "Per Device Threshold", is utilized to avoid reaching the "Per Device Limit" under normal conditions when the rate of destages can keep pace with the incoming write data. When the "Per Device Threshold" is reached, destage operations are generated to reduce the data in the write cache to a level below the threshold. Optimized performance can thus be achieved by dynamically adjusting the "Per Device Threshold".

To calculate the "Per Device Threshold", all devices should be allocated their fair share of the write cache space, and the entire write cache space (or nearly so) should be utilized when some devices are getting few or no host write operations. Optimal performance usually cannot be achieved if one device, or a small subset of devices, monopolizes the write cache when many devices are all getting host write operations. If the monopolization happens, the devices that are slowest to destage will take up the greatest amount of cache space, because all devices place data into the write cache quickly, but the devices that are slow to destage will build up more data in the write cache than those fast to destage. For example, if two devices both use half of a write cache, the overall write cache efficiency, which measures how well the write cache coalesces host write operations, is better than if one device uses the entire write cache while the other uses none. However, if only five of a total of ten devices receive host write operations, it would be a waste of resources if half of the write cache was simply reserved for the five devices with no host write operations. Therefore, one device or a subset of devices should be allowed to use the write cache space not being utilized by devices with no host write operations.

A "Per Device Threshold" must be less than its corresponding "Per Device Limit", and in practice the "Per Device Threshold" is usually no more than 90% of its corresponding "Per Device Limit". To calculate the threshold, first assign a fair value of CLs to the "Per Device Threshold", then add an additional amount of CLs to the threshold to ensure a full utilization of the write cache. The additional amount of CLs is the number of CLs which are unused by other devices minus the number of CLs which are overused by other devices. The "Per Device Threshold" is always kept at the fair value or above to allow the device to obtain its fair amount of data. The formula for calculating the "Per Device Threshold" is:

"Per Device Threshold"=MIN(90% of "Per Device Limit", Fair#CLs+MAX(0, TotalUnusedCLs−ThisDeviceUnusedCLs−TotalOverusedCLs+ThisDeviceOverusedCLs))

Where:
Fair#CLs=Overall cache threshold/#Devices
TotalUnusedCLs=Σ MAX(0, Fair#CLs−#CLs) for each device
ThisDeviceUnusedCLs=MAX(0, Fair#CLs−#CLs)
TotalOverusedCLs=Σ MAX(0, #CLs−Fair#CLs) for each device
ThisDeviceOverusedCLs=MAX(0, #CLs−Fair#CLs)

A "Per Device Threshold" is only able to regulate the amount of data in cache under conditions when the rate of destages can keep pace with the incoming write data. Once the rate of destages cannot keep pace, the "Per Device Threshold" is exceeded, and it is the "Per Device Limit" that ultimately stops more data than desired coming into the write cache for a device. In alternate embodiments of the present invention, an "Overall Threshold" for all devices can be utilized in place of, or in addition to, the "Per Device Threshold", and an "Overall Limit" can be utilized in place of, or in addition to, the "Per Device Limit".

Figure 3:
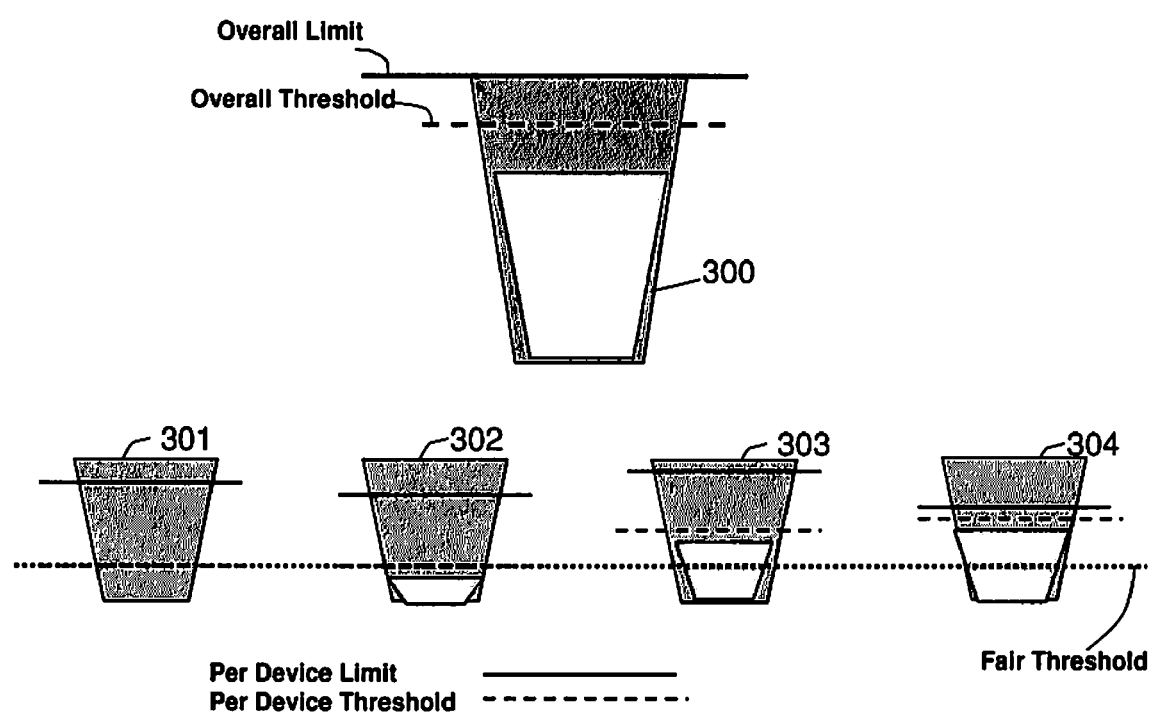
FIG. 3 is a diagram illustrating an "Overall Limit", an "Overall Threshold", a "Per device Limit" and a "Per Device Threshold" for the devices.

FIG. 3 illustrates the "Overall Limit", the "Overall Threshold", the "Per device Limit" and the "Per Device Threshold". A write cache 300 has an "Overall Limit" that is the size of the write cache, and an "Overall Threshold" that is set to be 90% of its "Overall Limit". Per-device write caches 301-304 are for four devices, each with a "Per Device Limit" (solid line in FIG. 3) and "Per Device Threshold" (dashed line in FIG. 3). The "Per Device Limit" of each device is calculated as described in the above-mentioned pseudo-code. The "Per Device Threshold" of each device is first set to be a fair threshold (dotted line in FIG. 3), such as in caches 301 and 302. But an additional amount of CLs can be added to the "Per Device Threshold" to dynamically adjust the threshold. Write cachess 303 and 304 have a higher "Per Device Threshold" because of a large amount of incoming data.

Figure 4:
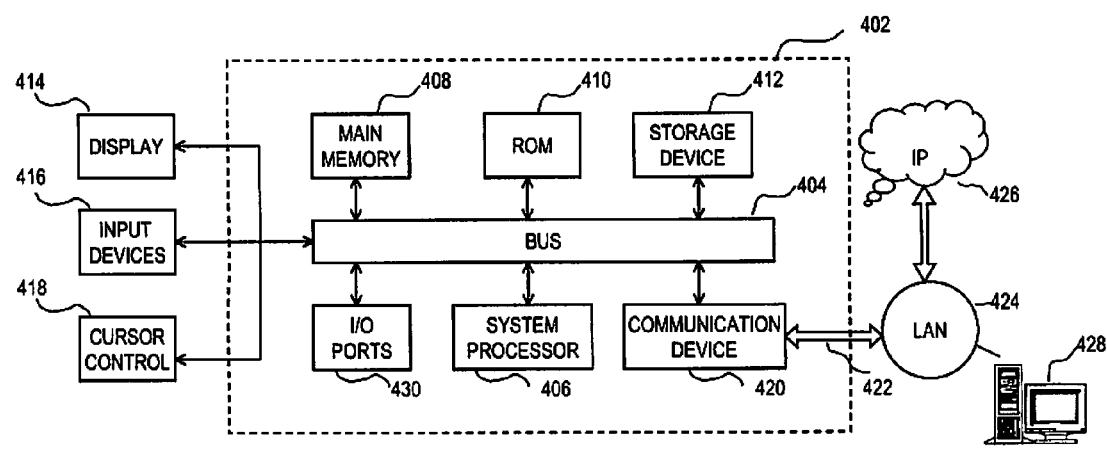
FIG. 4 is a conceptual diagram of a computer system in which the present invention can be utilized.

FIG. 4 illustrates a computer system (402) upon which the present invention may be implemented. The computer system may be any one of a personal computer system, a work station computer system, a lap top computer system, an embedded controller system, a microprocessor-based system, a digital signal processor-based system, a hand held device system, a personal digital assistant (PDA) system, a wireless system, a wireless networking system, etc. The computer system includes a bus (404) or other communication mechanism for communicating information and a processor (406) coupled with bus (404) for processing the information. The computer system also includes a main memory, such as a random access memory (RAM) or other dynamic storage device (e.g., dynamic RAM (DRAM), static RAM (SRAM), synchronous DRAM (SDRAM), flash RAM), coupled to bus for storing information and instructions to be executed by processor (406). In addition, main memory (408) may be used for storing temporary variables or other intermediate information during execution of instructions to be executed by processor. The computer system further includes a read only memory (ROM) 410 or other static storage device (e.g., programmable ROM (PROM), erasable PROM (EPROM), and electrically erasable PROM (EEPROM)) coupled to bus 404 for storing static information and instructions for processor. A storage device (412), such as a magnetic disk or optical disk, is provided and coupled to bus for storing information and instructions. This storage device is an example of a computer readable medium.

The computer system also includes input/output ports (430) to input signals to couple the computer system. Such coupling may include direct electrical connections, wireless connections, networked connections, etc., for implementing automatic control functions, remote control functions, etc. Suitable interface cards may be installed to provide the necessary functions and signal levels.

The computer system may also include special purpose logic devices (e.g., application specific integrated circuits (ASICs)) or configurable logic devices (e.g., generic array of logic (GAL) or re-programmable field programmable gate arrays (FPGAs)), which may be employed to replace the functions of any part or all of the method as described with reference to FIG. 1-FIG. 3. Other removable media devices (e.g., a compact disc, a tape, and a removable magneto-optical media) or fixed, high-density media drives, may be added to the computer system using an appropriate device bus (e.g., a small computer system interface (SCSI) bus, an enhanced integrated device electronics (IDE) bus, or an ultra-direct memory access (DMA) bus). The computer system may additionally include a compact disc reader, a compact disc reader-writer unit, or a compact disc jukebox, each of which may be connected to the same device bus or another device bus.

The computer system may be coupled via bus to a display (414), such as a cathode ray tube (CRT), liquid crystal display (LCD), voice synthesis hardware and/or software, etc., for displaying and/or providing information to a computer user. The display may be controlled by a display or graphics card. The computer system includes input devices, such as a keyboard (416) and a cursor control (418), for communicating information and command selections to processor (406). Such command selections can be implemented via voice recognition hardware and/or software functioning as the input devices (416). The cursor control (418), for example, is a mouse, a trackball, cursor direction keys, touch screen display, optical character recognition hardware and/or software, etc., for communicating direction information and command selections to processor (406) and for controlling cursor movement on the display (414). In addition, a printer (not shown) may provide printed listings of the data structures, information, etc., or any other data stored and/or generated by the computer system.

The computer system performs a portion or all of the processing steps of the invention in response to processor executing one or more sequences of one or more instructions contained in a memory, such as the main memory. Such instructions may be read into the main memory from another computer readable medium, such as storage device. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The computer system also includes a communication interface coupled to bus. The communication interface (420) provides a two-way data communication coupling to a network link (422) that may be connected to, for example, a local network (424). For example, the communication interface (420) may be a network interface card to attach to any packet switched local area network (LAN). As another example, the communication interface (420) may be an asymmetrical digital subscriber line (ADSL) card, an integrated services digital network (ISDN) card or a modem to provide a data communication connection to a corresponding type of telephone line. Wireless links may also be implemented via the communication interface (420). In any such implementation, the communication interface (420) sends and receives electrical, electromagnetic or optical signals that carry digital data streams representing various types of information.

Network link (422) typically provides data communication through one or more networks to other data devices. For example, the network link may provide a connection to a computer (426) through local network (424) (e.g., a LAN) or through equipment operated by a service provider, which provides communication services through a communications network (428). In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit notifications and receive data, including program code, through the network(s), the network link and the communication interface.

It should be understood, that the invention is not necessarily limited to the specific process, arrangement, materials and components shown and described above, but may be susceptible to numerous variations within the scope of the invention.

What is claimed is:

1. A method for dynamically optimizing a write cache policy-controlling metric for a storage adapter connected to a plurality of storage devices, the storage adapter having a write cache that includes a plurality of write cache spaces, each write cache space storing data for one of the plurality of storage devices and including a plurality of cache lines, the method comprising:

selecting one write cache space from the plurality of write cache spaces, the selected write cache space storing data for a corresponding one of the plurality of storage devices in N cache lines thereof;

maintaining a figure of locality for the data in the selected write cache space, including setting a locality flag for each of the N cache lines in which data have high spatial locality, counting a number of cache lines that have the locality flag set, and dividing the number of cache lines that have the locality flag set by N to obtain the figure of locality, wherein the setting includes:

when a write operation is directed to a sequence of cache lines in the selected write cache space, clearing the locality flag of the first cache line in the sequence and setting the locality flag of each of the subsequent cache lines in the sequence, and
when a sequentially prior cache line of a select cache line in the selected write cache space contains data, setting the locality flag of the select cache line; and
calculating the policy-controlling metric dynamically using the figure of locality and device-related information.

2. The method of claim 1, wherein the policy-controlling metric is a limit of the selected write cache space.

3. The method of claim 2, wherein the device-related information comprises a maximum number of destage operations that relates to a RAID level of an array in which the storage devices are members, and whether the array is exposed.

4. The method of claim 1, wherein the policy-controlling metric is a threshold of the selected write cache space, and the calculating comprises calculating the threshold of the selected write cache space by combining a fair amount and a device-related additional amount.

5. The method of claim 4, wherein the fair amount includes an average amount of the plurality of write cache spaces.

6. The method of claim 4, wherein the device-related additional amount includes a difference between a number of cache lines in the write cache unused by ones of the plurality of storage devices other than the corresponding storage device and a number of cache lines overused by the ones of the plurality of storage devices other than the corresponding storage device.

7. A computer program product for dynamically optimizing a write cache policy-controlling metric for a storage adapter connected to a plurality of storage devices, the storage adapter having a write cache that includes a plurality of write cache spaces, each write cache space storing data for one of the plurality of storage devices and including a plurality of cache lines, the computer program product comprising:
a non-transitory computer usable medium having computer usable program code embodied therewith, the computer usable program code comprising:
instructions to select one write cache space from the plurality of write cache spaces, the selected write cache space storing data for a corresponding one of the plurality of storage devices in N cache lines thereof;
instructions to maintain a figure of locality for the data in the selected write cache space, including instructions to set a locality flag for each of the N cache lines in which data have high spatial locality, instructions to count a number of cache lines that have the locality flag set, and instructions to divide the number of cache lines that have the locality flag set by N to obtain the figure of locality,
wherein the instructions to set include:
instructions, when a write operation is directed to a sequence of cache lines in the selected write cache space, to clear the locality flag of the first cache line in the sequence and to set the locality flag of each of the subsequent cache lines in the sequence, and
instructions, when a sequentially prior cache line of a select cache line in the selected write cache space contains data, to set the locality flag of the select cache line; and
instructions to calculate the policy-controlling metric dynamically using the figure of locality and device-related information.

8. The computer program product of claim 7, wherein the policy-controlling metric is a limit of the selected write cache space.

9. The computer program product of claim 8, wherein the device-related information comprises a maximum number of destage operations that relates to a RAID level of an array in which the storage devices are members, and whether the array is exposed.

10. The computer program product of claim 7, wherein the policy-controlling metric is a threshold of the selected write cache space, and the instructions to calculate comprises instructions to calculate the threshold of the selected write cache space by combining a fair amount and a device-related additional amount.

11. The computer program product of claim 10, wherein the fair amount includes an average amount of the plurality of write cache spaces.

12. The computer program product of claim 10, wherein the device-related additional amount includes a difference between a number of cache lines in the write cache unused by ones of the plurality of storage devices other than the corresponding storage device and a number of cache lines overused by the ones of the plurality of storage devices other than the corresponding storage device.

13. A computer system comprising:
a processor;
a memory operatively coupled with the processor;
a storage device operatively coupled with the processor and the memory; and
a computer program product for dynamically optimizing a write cache policy-controlling metric for a storage adapter connected to a plurality of storage devices, the storage adapter having a write cache that includes a plurality of write cache spaces, each write cache space storing data for one of the plurality of storage devices and including a plurality of cache lines, the computer program product comprising:
a non-transitory computer usable medium having computer usable program code embodied therewith, the computer usable program code comprising:
instructions to select one write cache space from the plurality of write cache spaces, the selected write cache space storing data for a corresponding one of the plurality of storage devices in N cache lines thereof;
instructions to maintain a figure of locality for the data in the selected write cache space, including instructions to set a locality flag for each of the N cache lines in which data have high spatial locality, instructions to count a number of cache lines that have the locality flag set, and instructions to divide the number of cache lines that have the locality flag set by N to obtain the figure of locality
wherein the instructions to set include:
instructions, when a write operation is directed to a sequence of cache lines in the selected write cache space, to clear the locality flag of the first cache line in the sequence and to set the locality flag of each of the subsequent cache lines in the sequence, and
instructions, when a sequentially prior cache line of a select cache line in the selected write cache space contains data, to set the locality flag of the select cache line; and
instructions to calculate the policy-controlling metric dynamically using the figure of locality and device-related information.

14. The computer system of claim 13, wherein the policy-controlling metric is a limit of the selected write cache space.

15. The computer system of claim 14, wherein the device-related information comprises a maximum number of destage operations that relates to a RAID level of an array in which the storage devices are members, and whether the array is exposed.

16. The computer system of claim 13, wherein the policy-controlling metric is a threshold of the selected write cache space, and the instructions to calculate comprises instructions to calculate the threshold of the selected write cache space by combining a fair amount and a device-related additional amount.

17. The computer system of claim 16, wherein the fair amount includes an average amount of the plurality of write cache spaces.

18. The computer system of claim 16, wherein the device-related additional amount includes a difference between a number of cache lines in the write cache unused by ones of the plurality of storage devices other than the corresponding storage device and a number of cache lines overused by the ones of the plurality of storage devices other than the corresponding storage device.

* * * * *